UNITED STATES PATENT OFFICE.

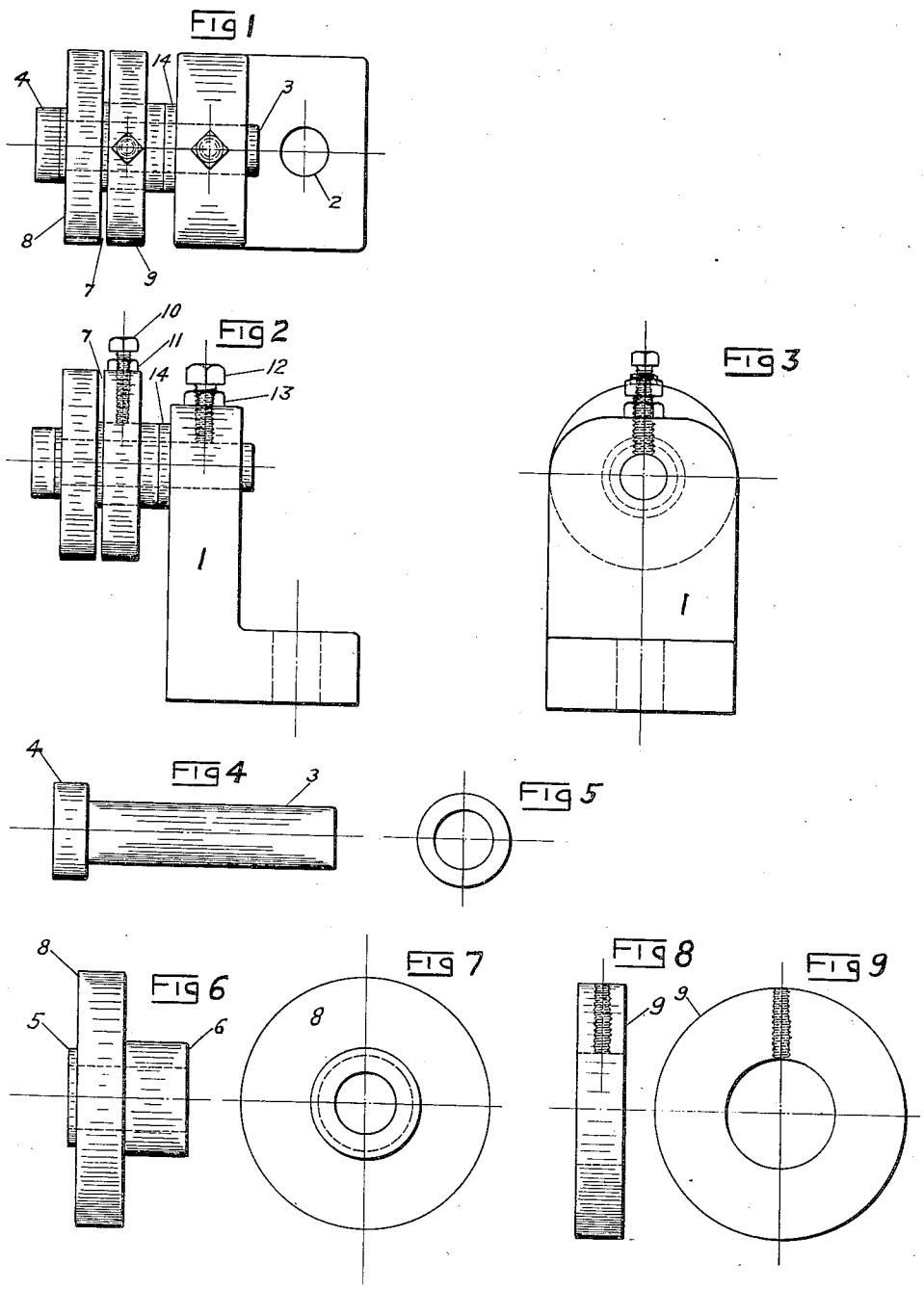

HERMAN VOLZ, OF NEWARK, NEW JERSEY.

BAND-SAW GUIDE.

1,304,128.  Specification of Letters Patent.  Patented May 20, 1919.

Application filed February 3, 1919. Serial No. 274,675.

*To all whom it may concern:*

Be it known that I, HERMAN VOLZ, a citizen of the United States, residing at Newark, in the county of Essex and State of New Jersey, have invented certain new and useful Improvements in Band-Saw Guides, of which the following is a specification.

In the use of band saws it is customary to provide some sort of a guide for the saw, both for the vertical sides and back thereof. A number of different styles of guides have been proposed and used including rollers for both the sides and back, adjustable stationary jaws for the sides and a back roller, and various other combinations all of which have objectionable features since in these devices the side rollers or guides are mounted on independent bearings from each other and from the back guide. I have found that many of these devices are very costly to make and are apt to get out of order. Furthermore, the stationary jaws wear very quickly and do not guide the saw as closely as desired. In such devices there is also a great amount of wear on the saw itself with the result that the temper is likely to be drawn out of the saw. In practically all the saw guides that have been proposed in the past, the adjustment is dependent on the eye of the adjuster; that is to say, considerable care must be exercised in order to get proper adjustment.

It is the principal object of my invention to provide an exceedingly cheap but accurate saw guide and one that is easily and quickly adjusted.

Other and further objects will be apparent to one skilled in the art after a study of the specification and drawings attached thereto, wherein—

Figure 1 is a plan view of my saw guide.

Fig. 2 is a side elevation thereof, while

Fig. 3 is a right hand end view of Fig. 2.

Fig. 4 is a view of the spindle.

Fig. 5 is a right hand end view of Fig. 4.

Fig. 6 is a plan view of the spindle carrying preferably an integral side member.

Fig. 7 is a right hand end view of Fig. 6.

Fig. 8 is a side view of the other side guide member, and

Fig. 9 is a plan view of Fig. 8.

Referring now to the details, wherein like numbers refer to corresponding parts in the various views, 1 is a support adapted to be fastened by a bolt passing through the hole 2 to any suitable bracket on the saw frame. Since the bracket and other parts of the saw constitute no part of my invention they are not herewith shown or described; however, it will be understood that the bracket may be adjustable or the support 1 may be adjustable on the bracket by the use of a suitable bolt, or other fastening means, for the hole 2. A spindle 3 is carried by the support 1. The outer end of the spindle 3 has preferably an integral head 4 against which the end 5 of a sleeve 6 abuts. The sleeve 6 is adapted to rotate on the spindle 3 and serves as a back guide for the saw. This sleeve 6 has a disk substantially like flange 8 which forms a side guide for one side of the saw. In the manufacture of my device, I prefer to make the sleeve 6 and side guide member 8 as an integral structure from proper material, such as steel. A substantial annular disk 9 fitted to slide on the sleeve 6, furnishes a side guide for the other side of the saw which engages the flat sides of 8 and 9 throughout their radial dimensions while its back edge directly engages the sleeve 6 which carries flange 8 and on which disk 9 is adapted to slide. The side guide member 9 is adapted to be adjusted on the sleeve 6, one such means being provided by the set screw 10 and locknut 11. The spindle 3 is adapted to be adjusted at right angles to the support 1 by means of the set screw 12 and locknut 13. The space between the end of the sleeve 6 and the support 1 is taken up by one or more washers 14 of suitable thickness. It is to be understood that the sleeve 6 is of suitable thickness so that there is no danger of the clamping screw 10 pressing the material hard enough to make the sleeve turn hard on the spindle 3. The side members 8 and 9, together with the sleeve 6, after being made nearly to size, are preferably hardened and ground to present a smooth, hard and true wearing surface for the saw. It is to be understood that the side guide member 9 is so constructed both as to length of bearing and closeness of fit on the sleeve 6 in a manner to prevent all rocking motion, hence during the process of adjustment the slot 7 for the saw on either side of the sleeve 6 is uniform and quickly set by sliding the member 9 to the desired position.

A comparison of my device with others in the art will readily show its simplicity and while I have shown a preferred form of my invention, it will be understood that certain changes are susceptible without departing from the spirit of the invention and the scope of the appended claims.

Having thus described my invention, what I claim is:—

1. A band saw guide comprising, a support, a spindle carried by said support, a rotary sleeve on said spindle having an integral side guide flange or member with a flat face extending from the sleeve portion outwardly and a flat face disk slidably adjustable on said sleeve, said sleeve extending through said disk, said disk having such length of bearing and so close a fit on said sleeve as to insure the parallelism of the opposing faces of said disk and flange for all adjustments and means engaging said sleeve to secure such adjustments.

2. A band saw guide comprising, a support, a spindle adjustably carried by said support, a rotary sleeve on said spindle, a pair of side guide members adjustably supported one with respect to the other on said sleeve, said sleeve extending through at least one of said side guide members, said guide members having flat faces presented toward each other forming a single uniform annular saw slot for all positions of adjustment of said guide members.

In witness whereof I affix my signature.

HERMAN VOLZ.